Figure 1:
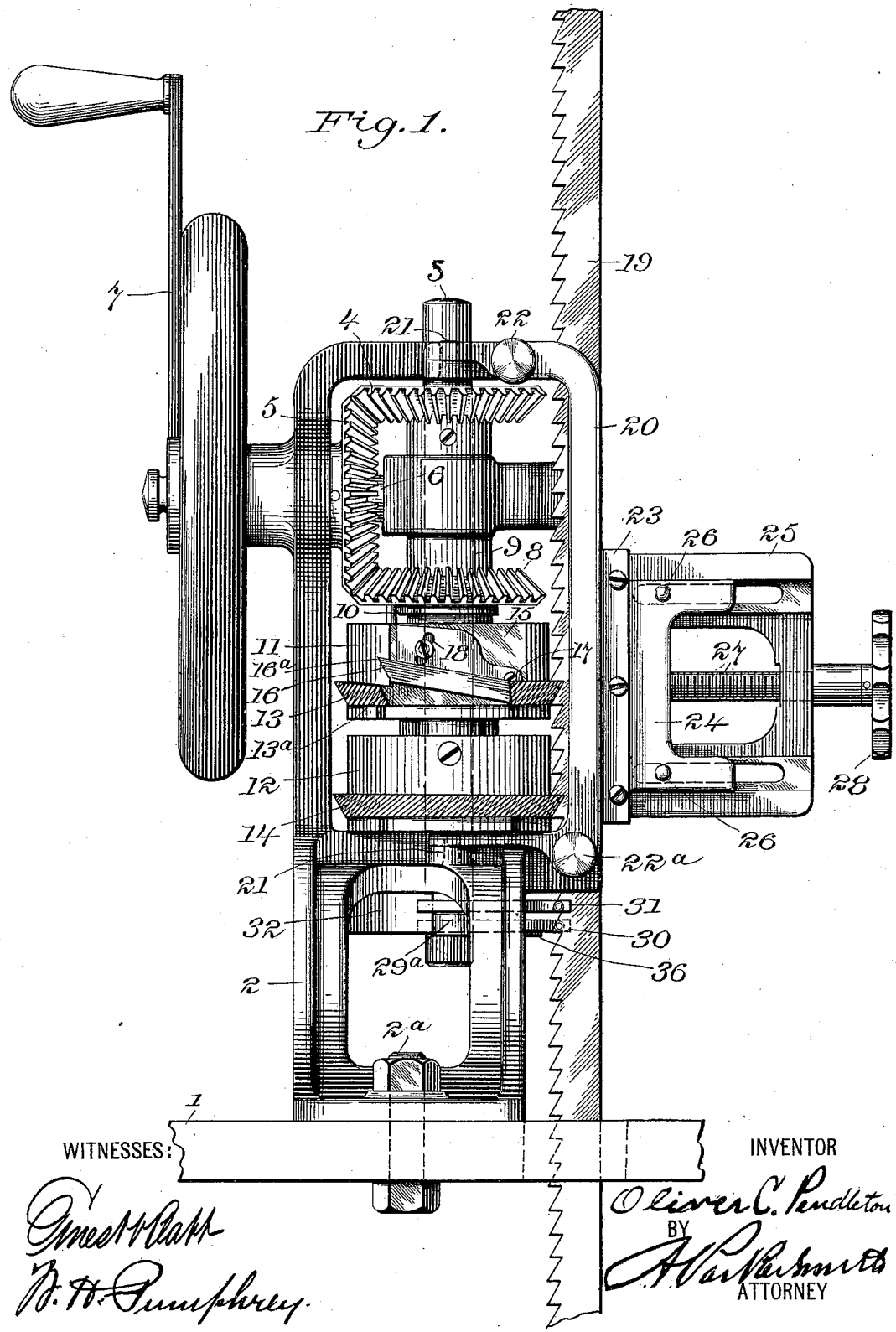

No. 645,514. Patented Mar. 13, 1900.
O. C. PENDLETON.
SAW FILING MACHINE.
(Application filed Jan. 19, 1899.)
(No Model.) 2 Sheets—Sheet 1.

WITNESSES:

INVENTOR
Oliver C. Pendleton
BY
ATTORNEY

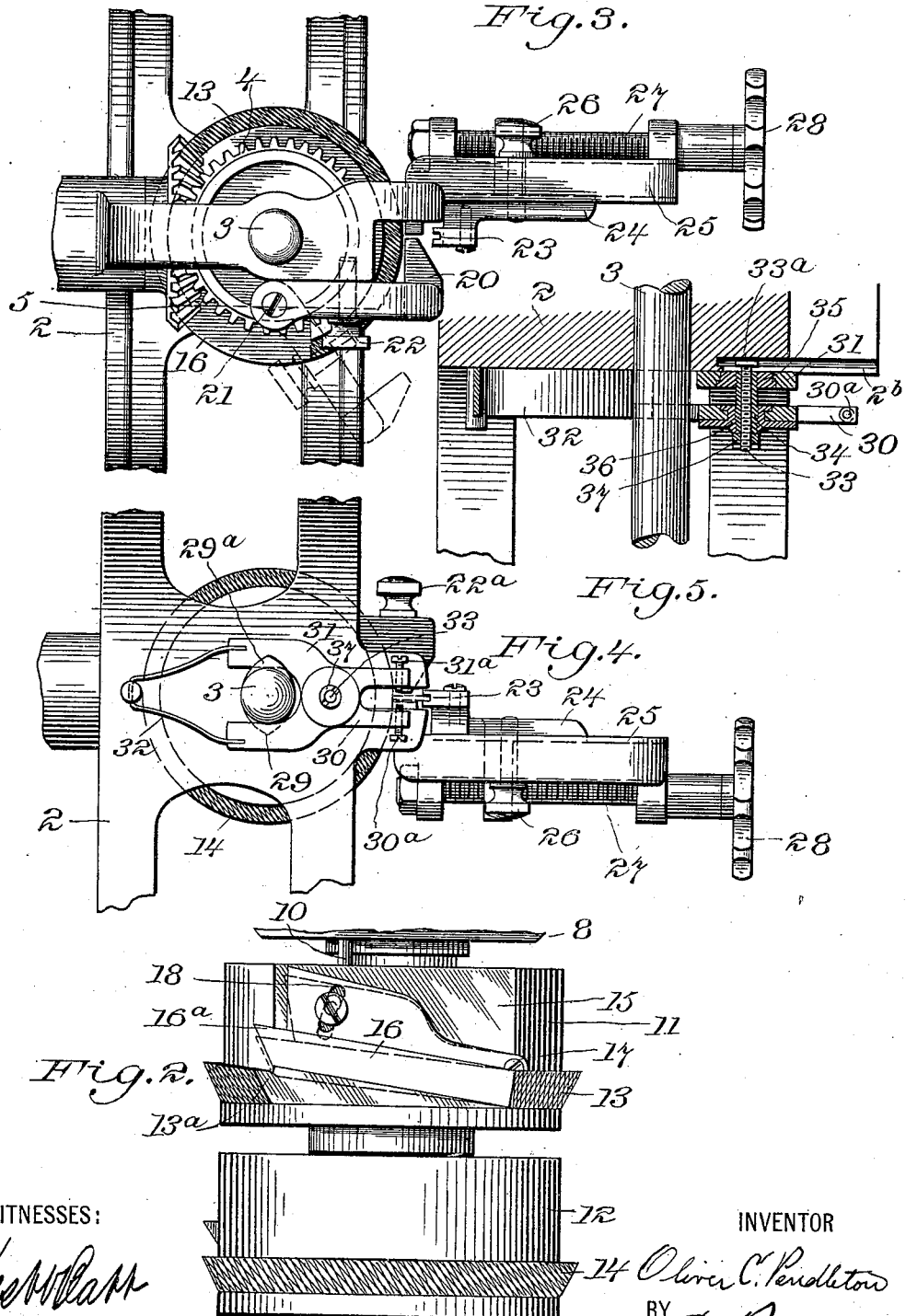

United States Patent Office.

OLIVER C. PENDLETON, OF NEW YORK, N. Y.

SAW-FILING MACHINE.

SPECIFICATION forming part of Letters Patent No. 645,514, dated March 13, 1900.

Application filed January 19, 1899. Serial No. 702,645. (No model.)

*To all whom it may concern:*

Be it known that I, OLIVER C. PENDLETON, a citizen of the United States of America, and a resident of the city of New York, borough of Brooklyn, county of Kings, and State of New York, have invented certain new and useful Improvements in Saw-Filing Machines, (Case A,) of which the following is a specification.

My invention relates to saw-filing machines of the type in which one or more rotary files are rotated in contact with the teeth of the saw; and it consists of certain improvements in such machines whereby the same may be conveniently mounted upon the bed-plate of a band-saw machine for operating on said band-saw and whereby one file or set of files can be used on saws of varying numbers of teeth to the inch and such adjustments made without removing any of the parts of the machine. Furthermore, these said adjustments may be made to adapt the machine to each particular saw when the saw is being introduced to the machine.

It also consists of the combination, with such saw-filing mechanism or its equivalent, of a saw-setting attachment operated by the same driving mechanism which actuates the saw-filing apparatus, so that the filing and setting of the saw can be done simultaneously.

The preferred form of apparatus for carrying out my invention is illustrated in the accompanying two sheets of drawings, in which—

Figure 1 is a side elevation of my machine with a portion of the band-saw and band-saw table shown in conjunction therewith. Fig. 2 is an enlarged detail of Fig. 1, showing the method of adjusting the saw-feeding apparatus. Fig. 3 is a detail plan view of Fig. 1. Fig. 4 is a detail bottom view showing the saw-setting apparatus. Fig. 5 is a vertical central detail section showing the adjustable mounting for the saw-setting levers.

Throughout the drawings like reference-figures refer to like parts.

Upon the bed plate or table 1 of the band-saw machine (not shown) is clamped the frame 2 of the filing and setting mechanism by means of one or more bolts and nuts $2^a$. In the main frame 2 is journaled the vertical shaft 3, on which is keyed or otherwise fixed a bevel-gear 4, meshing with a bevel-gear 5, mounted on and rotated with the driving-shaft 6, which is rotated by the crank 7 or other means. A second bevel-gear 8, rotating loosely on the shaft 3, is arranged opposite to the bevel-gear 4 and also meshing with the bevel-gear 5. This bevel-gear 8 is mounted on a sleeve 9, which rotates on the shaft 3. Also mounted on the shaft 3 is the hollow mandrel 11, which is caused to rotate with the gear 8 by the pin 10, which enters a recess in said gear. This hollow mandrel 11 is maintained in position by a similar mandrel 12 below it, which latter mandrel is keyed or fastened by a set-screw to the shaft 3, so as to revolve therewith. Any number of washers may be introduced between the mandrels 12 and 11 to adjust the distance between them, or other means for securing this result may be employed. On the mandrel 11 is the circular file 13, forming an arc of about five-sixths of the circumference of a circle, and on the mandrel 12 is a similar file 14. The upper mandrel 11 has a cut-away or flattened portion 15, whose surface is a plane passing through the chord of the arc of the file 13. The smooth-faced guide-strip 16, of similar cross-section to the file 13, is pivoted at one end 17 to the mandrel, so that that end of the guide-strip abuts against the end of the file 13. The inclination of the guide-strip 16 to the file 13 may be varied by turning it about this pivotal point 17 and clamping it to the mandrel in such different positions. The preferred clamping apparatus shown consists of the slot 18 in a projection on the strip 16 and set-screw coöperating therewith. The free end $16^a$ of the guide-strip 16 and the coöperating end $13^a$ of the file are beveled to corresponding angles, so that they will in a measure overhang each other. The files 13 and 14 are both made tapering longitudinally, the end $13^a$ of the file 13 being smaller and the cross-section gradually increasing throughout the length of the file, the difference between the two ends being about one thirty-second of an inch in the average file. A similar taper in the opposite direction is given to the file 14, so that the smaller end of each file always enters the teeth first.

The saw-blade 19 is held in position by the swinging guide 20, pivoted to the frame at upper and lower pivotal points, the upper pivotal point being shown at 21 in Fig. 3. This swinging frame is held in position by the thumb-screws 22 22ª. The saw-blade is held up to the file by the grooved back guide 23, mounted on the carriage 24, which slides in guides on the extension-piece 25 and is held to said piece 25 by bolts or pins 26 and adjusted thereon by the feed-screw 27, set by the hand-wheel 28.

On the lower end of the rotating shaft 3 are the two cams 29 and 29ª, which are located between the two levers 30 and 31, which are normally held in engagement with the cams by the double spring 32 or equivalent device. These levers are called the "saw-setting" levers, and they are pivoted together, so as to form practically a pair of pincers on a pivoted pin 33. This pivoted pin 33 is held in position by reason of the fact that its head 33ª slides in the recessed groove 2ᵇ on the main frame. (See Fig. 5.)

On the pivot-pin is a sleeve 34, whose exterior surface is threaded, and this sleeve is held on the pin 33 by the nut 37. The setting-lever 31 is journaled on this sleeve 34 by the correspondingly-threaded journal-bearing 35, which is pressed into a perforation in said lever. The saw-setting lever 30 is mounted on the adjustable journal formed by the externally-grooved thimble 36, which is adjustable on the screw-threaded sleeve 34. In the ends of the saw-setting levers 30 31 are adjustable screws 30ª and 31ª or similar adjustable projections.

The mode of operation of my invention is as follows: The swinging guide-frame 20 being thrown out, as shown in dotted lines in Fig. 3, and the grooved back guide 23 being withdrawn by turning the hand-wheel 28, the frame 2 is adjusted upon the bed-plate 1 in such a position as to bring the band-saw 19 in position for being filed. The adjustable back guide 23 is then forced forward by turning the hand-wheel 28 in the opposite direction until the saw-teeth come into engagement with the files, as shown in Fig. 1. The swinging guide-frame 20 is then thrown back into the position shown in full lines in Fig. 3 and clamped there by means of the thumb-screws 22 and 22ª. The mandrels 11 and 12 are then adjusted to the proper distance to hold the files in exact engagement with the proper teeth of the saw by any convenient means not specifically shown in the drawings, as by the introduction of washers or by turning set-nuts. The files are then slowly rotated and the adjustable guide-strip 16 clamped at just the right inclination to feed the saw two teeth at each revolution. The file 14 may have a guide-strip similar to that shown at 16, the same being hidden from view in Fig. 1, or the one guide-strip may serve all the purposes of feeding the saw. A continued rotation of the driving-shaft 6 then files the saw, the file 13 operating on the even teeth and 14 upon the odd teeth. The tapering files take a light cut at first, but continue increasing said cut as the larger end of the file is approached, thus equalizing the work throughout the entire length of the file. The guide-strip 16 lifts the saw, and on account of the beveling of the ends 16ª and 13ª the saw is delivered to the other end of the file before it is entirely released by the guide-strip. While the circular files are operating on the saw and holding the saw-blade stationary, the cams 29 and 29ª force the rear end of the levers 30 and 31 apart and cause the adjustable screws 30ª and 31ª in the other end of said levers to approach. These levers are so adjusted on their adjustable pivot-bearings that said adjustable projections 30ª and 31ª will go against the sides of two adjacent saw-teeth, as shown in Fig. 1, and bend them to the right and left a predetermined distance, thus giving said teeth their proper "set." This operation having been performed, the cams 29 29ª release the tail ends of the levers 30 31 and the spring 32 brings them together, thus opening the pair of pincers formed by the levers 30 and 31, leaving the saw free to be fed forward by the guide-strip 16 in position for two other teeth to be filed and two other teeth to be set. The setting-levers 30 and 31 can be adjusted at the proper distance apart in the line of their common pivot 33, so as to abut against the teeth of different saws by loosening the nut 37 and turning the threaded sleeve 34 or the grooved journal-nut 36, or both. At the same time the throw of the setting-levers may be varied by shifting said pivot-pin in and out along the groove 2ᵇ or by adjusting the screws 30ª and 31ª or by both methods of procedure. When the proper adjustment is secured, the nut 37 is set up hard against the end of the sleeve 34 and the parts are made rigid. The lever 30 then vibrates on its screw-threaded bearing on the sleeve 34, the journal-bearing 35 having been forced into the eye of the lever and held there by frictional contact. The bearing-nut 36 for the lever 30 is mounted loosely enough in said lever to be turned therein by hand, but still has enough frictional contact with it to oscillate back and forth with said lever and not shift its position on the screw-threaded sleeve 34.

The advantages of my invention consist in the fact that it has a rigid, but easily-adjusted, bearing upon the bed-plate of the machine and the fact that one file or one set of files can be used for different saws of any pitch, that the feeding device may be adjusted without removing any parts and adjusted to each particular saw without the necessity of making nice measurements, and in the fact that a simple saw-setting device capable of exact adjustment is provided which may be used in combination with the saw-filing apparatus to file and set the saw at one operation. The tapering files distribute the work evenly throughout the entire revolution of the apparatus, thereby avoiding shocks and a tendency to bend instead of file the saw-teeth, and the two files rotating in opposite directions each files the tooth in the direction in which it is bent by the setting apparatus, thereby avoiding any danger of binding the teeth against the file.

It is evident that various changes could be made in the details of the apparatus herein described and illustrated without departing from the spirit and scope of my invention. Other mechanical elements could be substituted for those shown which would produce the same motions and have the same functions. A less or a greater number of files might be employed, &c.; but all these modifications I consider within the scope of my invention.

Having therefore described my invention, what I claim as new, and desire to protect by Letters Patent, is—

1. In a saw-filing machine, the combination of a cylindrical file-holder, a spiral file mounted thereon, said file tapering longitudinally, means for feeding a saw-blade in a line parallel to the axis of the file-holder, and means for rotating said file-holder in a direction such that the smaller end of the file first engages the saw.

2. In a saw-filing machine a curved file tapering longitudinally, combined with means for rotating said file in such direction that the smaller end of the file will first engage the saw-tooth, and an adjustable pivoted guide-section between the ends of the file and completing with it one revolution of a spiral, substantially as described.

3. In a saw-filing machine the combination of a curved file forming part of the circumference of a circle, and an adjustable guide-section forming the remainder of said circumference, the free end of said guide-section and the adjacent end of the file being correspondingly beveled, substantially as described.

4. In a saw-filing machine the combination of the mandrel, the curved file thereon, bent into the arc of a circle, the uninclosed arc of the mandrel circumference being cut away on the plane of the chord of said arc, a guide-section pivoted at one end to abut against one end of the file, and means for clamping the guide-section in different positions along the flattened surface of the mandrel so as to produce varying degrees of inclination to the plane of the file, substantially as described.

5. In a saw-filing machine the combination of the mandrel, the curved file thereon bent into the arc of a circle, the uninclosed arc of the mandrel circumference being cut away on the plane of the chord of said arc, a guide-section pivoted at one end to abut against one end of the file, and a slotted extension to the guide-section and a set-screw for clamping the guide-section in different positions along the flattened surface of the mandrel so as to produce varying degrees of inclination to the plane of the file, substantially as described.

6. In a saw-filing machine the combination of one or more rotating files, a shaft which rotates one of said files, cams on said shaft, and a pair of oppositely-acting levers actuated by said cams to set the teeth of the saw while being filed, together with pivot-bearings for said levers adjustable toward and away from the cam-shaft, substantially as described.

7. In a saw-filing machine the combination of one or more rotating files, a shaft which rotates one of said files, cams on said shaft, and a pair of oppositely-acting levers actuated by said cams to set the teeth of the saw while being filed, together with attachments to said levers adjustable toward and from each other whereby the amount of set given the saw-teeth may be varied, substantially as described.

8. In a saw-setting mechanism the combination of the guide for the saw-blade, the rotating cam-shaft, and the oppositely-acting levers operated thereby arranged to press adjacent saw-teeth in opposite directions, together with a pivot for said levers adjustable toward and away from said cam-shaft.

9. In a saw-setting mechanism the combination of the guide for the saw-blade, the rotating cam-shaft, and the oppositely-acting levers operated thereby arranged to press adjacent saw-teeth in opposite directions, together with the pivot-pin adjustable toward and away from said cam-shaft and the journal-bearings for said levers adjustable lengthwise of said pivot-pin, substantially as described.

10. In a saw-setting mechanism the combination of the guide for the saw-blade, the rotating cam-shaft, and the oppositely-acting levers operated thereby arranged to press adjacent saw-teeth in opposite directions, together with the adjustable pivot-pin for said levers, the externally-screw-threaded sleeve for said pivot-pin, the threaded journal-bearing thereon of one of the levers, and the adjustable nut on said sleeve which forms the journal for the other lever, substantially as described.

Signed by me at New York city, New York, this 4th day of January, 1899.

OLIVER C. PENDLETON.

Witnesses:
 LILIAN FOSTER,
 J. E. PEARSON.